March 29, 1955     G. F. SCHLAUDECKER     2,705,242
ESTERIFICATION OF DITHIOSALICYLIC ACID
Filed Aug. 13, 1953
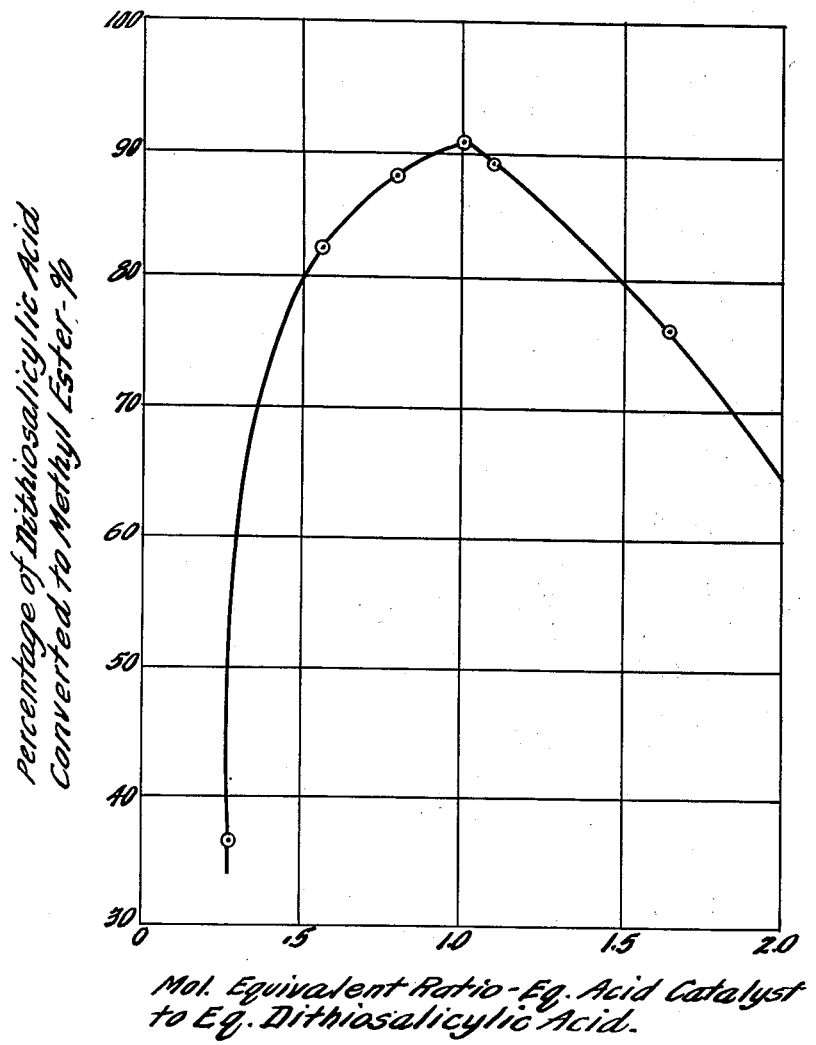
INVENTOR
George F. Schlaudecker,
BY Watson, Cole, Grindle & Watson
ATTORNEY

2,705,242

ESTERIFICATION OF DITHIOSALICYLIC ACID

George F. Schlaudecker, Toledo, Ohio, assignor to Maumee Development Company, Toledo, Ohio, a corporation of Ohio Application August 13, 1953, Serial No. 373,973

4 Claims. (Cl. 260—470)

This invention relates to a method of esterifying dithiosalicylic acid, more properly known as 2-2'-dicarboxydiphenyl disulfide, which has the structural formula:

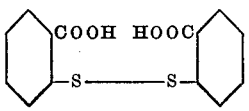

with monohydric alcohols to form esters having valuable therapeutic properties, and useful as intermediates. The present application is a continuation-in-part of my copending application, Serial No. 239,007, filed July 27, 1951, now abandoned.

It is well recognized that ortho substituted acids are difficult to esterify, possibly because of steric hindrance. Any commercial method of esterifying these materials must, of course, do so economically and in a reasonable time with reasonable yields.

I have found that dithiosalicylic acid may be esterified in good yields and within a reasonably short time by observance of certain processing conditions, especially operation at elevated temperatures, and by employment of an acid catalyst in a mol ratio based on the amount of dithiosalicylic acid present.

Previous descriptions in the literature have been sketchy, in that no mention has been made of operating at higher temperatures, or with close control of catalyst quantities. Usual practice has been to employ "a small amount" of mineral acid, of the order of 2% to 4% of the weight of the batch.

In accordance with my invention, I operate at elevated temperatures in the range of 65° to 125° C. by increasing the pressure on the reaction mixture, particularly when esterifying with alcohols of low normal boiling point. I have also found that the ratio of equivalents of acid catalyst to equivalents of dithiosalicylic acid should be between about 0.3 and about 2.0 with the optimum value of 1.0. Five mols of alcohol per equivalent of dithiosalicylic acid give excellent results, including substantial increase in ultimate yield and in the fluidity of the mixture. As little as one mol can be used, and there is no particular advantage in using more than ten.

With regard to the temperature range specified, I have discovered that while some esterification occurs at temperatures below 65° C., the esterification is so slow as to be uneconomical, while at temperatures above 125° C., excessive decomposition occurs. Similarly, I have found that esterification occurs outside the specified acid catalyst concentration range, but that at a rate below about 0.3 acid equivalent ratio of catalyst to dithiosalicylic acid, the rate of conversion is uneconomically slow, while at ratios above about 2.0 acid equivalent ratio, the rate decreases markedly, excessive decomposition occurs, and the quantities of acid catalyst used are uneconomical.

In the accompanying drawing is represented graphically the effect on the yield of varying the ratio of mineral acid to dithiosalicylic acid over and somewhat beyond the range of ratios I have found eminently satisfactory. It will be observed that in this graph the yields are plotted as ordinates and the mol equivalent ratios of acid catalyst to dithiosalicylic acid as abscissae. The results as represented by the curve are typical of those obtained in the course of considerable experimental research leading to the invention, and the conditions observed and the procedure followed in obtaining the values plotted in the drawing are as essentially as follows.

Twenty-gram portions of dithiosalicylic acid were thoroughly mixed with methyl alcohol to which sulfuric acid in the proper quantity had been previously added. Sufficient methyl alcohol was used to make the resulting mixture at least fluid enough to be stirred as a thin paste. This mixture of dithiosalicylic acid, methyl alcohol and sulfuric acid was made up in a 100 cc. bottle and capped loosely. A number of such samples, using varying amounts of acid, were placed in an autoclave which was then sealed. A number of samples were run at one time to eliminate slight temperature variations in heating.

The autoclave was heated to between 90° and 100° C. and held ±1° C. for 18 hours. After reducing the autoclave pressure by cooling, the sample bottles were removed. The individual samples were neutralized with ammonium hydroxide. Sufficient ammonia was used to dissolve the unreacted dithiosalicylic acid. The ester portion was filtered from the mother liquor, washed, dried and weighed. The unreacted dithiosalicylic acid was precipitated, washed, dried and weighed. From the original dithiosalicylic acid and the amount remaining after esterification, yields were calculated.

It will be noted that the lower limit of mol equivalent ratios falls on a sharply rising curve, so that a slight variation in this minimum limit may produce a very substantial variation in the percentage yield of ester. A minimum ratio of about 0.3 is found, however, ordinarily to give a yield in the neighborhood of 60% and therefore represents fairly the approximate lower limit of effectiveness in the practice of the invention. It will be observed that this limit is embraced within the range of ratios described as effective in my copending application above mentioned. For all practical purposes, an upper limit of mol equivalent ratio of 2.0, as specified in my copending application, giving a yield of about 65%, represents fairly the upper limit of the range of ratios within which the benefits of the invention may be effectively realized.

The following specific examples, not intended to limit the scope of the invention, are illustrative of my practice.

*Example 1.*—In 200 parts (5 mols) of methyl alcohol are suspended 153 parts (½ mol) of dithiosalicylic acid. To this mixture are added 53 parts of 66° Baumé sulfuric acid (93% H₂SO₄ by weight). The resultant slurry is heated in an autoclave at temperatures ranging from 65° to 125° C. and for periods ranging from 12 hours to 24 hours. The pressure developed is, of course, a function of temperature, and the reaction time varies inversely with temperature. For example, on heating the mixture to 100° C. for 18 hours, 90.9% of the dithiosalicylic acid was converted to the corresponding dimethyl ester, while holding at 65° C. for 112 hours effected only 67% conversion.

The reaction mass is cooled, the pressure released from the autoclave, and the mass neutralized with ammonium hydroxide. The ester formed is filtered off, washed with additional ammonium hydroxide, and dried. The melting point of the ester is 134° C. The filtrate and wash liquor may be acidified to recover the unreacted dithiosalicylic acid for reprocessing.

*Example 2.*—To 300 parts of isopropyl alcohol are added 53 parts of 66° Baumé sulfuric acid and 153 parts of dithiosalicylic acid. The resultant mixture is placed in an autoclave and heated to 83° C. for 24 to 36 hours. The reaction mass is treated as in Example 1. The melting point of the product, di-isopropyl ester of dithiosalicylic acid, is 96–97° C.

*Example 3.*—To 370 parts of isobutyl alcohol are added 53 parts of 66° Baumé sulfuric acid and 153 parts of dithiosalicylic acid, the resultant mixture is placed in an autoclave and heated to 107° C. for 12 hours. The reaction mass is treated as in Example 1. The melting point of the di-isobutyl ester of dithiosalicylic acid is 100–101° C.

*Example 4.*—To 370 parts of normal butyl alcohol are added 53 parts of 66° Baumé sulfuric acid and 153 parts of dithiosalicylic acid. The resultant mixture is heated at 117° C. for 12 hours. The reaction mass is treated as in Example 1. The melting point of the di-n-butyl ester of dithiosalicylic acid is 83° C.

*Example 5.*—To 440 parts of iso-amyl alcohol are added 53 parts of 66° Baumé sulfuric acid and 153 parts of dithiosalicylic acid. The resultant mixture is heated in an autoclave at 113° C. for 12 hours. The pressure is released and the reaction mass treated as in Example 1. The di-iso-amyl ester of dithiosalicylic acid melts at 75–76° C.

*Example 6.*—To 200 parts of methyl alcohol are added 39 parts of 85% phosphoric acid and 153 parts of dithiosalicylic acid. The resultant mixture is heated in an autoclave for 18 hours at 100° C. The reaction mass is cooled, the pressure in the autoclave released, and the reaction mass treated as in Example 1.

*Example 7.*—To 200 parts of methyl alcohol are added 53 parts of 66° Baumé sulfuric acid, 27 parts of water and 153 parts of dithiosalicylic acid. The resultant mixture is heated in an autoclave at 100° C. for 18 hours. At the end of this time, the reaction mass is cooled, the pressure released on the autoclave, and the reaction mass treated as in Example 1.

It will be appreciated that the instant invention is concerned primarily with the establishment of new and useful processing conditions, rather than with novel reagents, the reaction itself being generally known. The invention contemplates, therefore, the esterification of dithiosalicylic acid with any monohydric alcohol, being particularly concerned, however, with alcohols containing less than 8 carbon atoms in the molecule. Any such monohydric alcohols may therefore be substituted in the foregoing examples with comparable results, and other mineral acids, for instance hydrochloric acid, may be used to catalyze the reaction.

Such further modifications of the herein described processes as would normally occur to those skilled in the art, within the limitations imposed by critical conditions and amounts of reactants and catalyst, are contemplated as part of the instant invention.

Having thus described the invention, what is claimed as new and desired to be secured by Letters Patent is:

1. The process of preparing esters of dithiosalicylic acid which comprises heating a suspension of dithiosalicylic acid in a monohydric alcohol, having less than 8 carbon atoms in the molecule, to a temperature within the range 65° C. to 125° C. in the presence of a mineral acid catalyst selected from the group consisting of sulfuric, phosphoric, and hydrochloric acids, the molar ratio of alcohol to dithiosalicylic acid being between 10:1 and 1:1, and the acid equivalent ratio of acid catalyst to dithiosalicylic acid being between 0.3:1 and 2.0:1.

2. The process of claim 1 in which the acid equivalent ratio of acid catalyst to dithiosalicylic acid is about 1:1.

3. The process of claim 1 in which the alcohol is methyl alcohol.

4. The process of preparing esters of dithiosalicylic acid which comprises heating a suspension of dithiosalicylic acid in a monohydric alcohol, having less than 8 carbon atoms in the molecule, to a temperature within the range 65° C. to 125° C., in the presence of a mineral acid catalyst selected from the group consisting of sulfuric, phosphoric and hydrochloric acids, the molar ratio of alcohol to dithiosalicylic acid being about 5:1, and the acid equivalent ratio of acid catalyst to dithiosalicylic being between 0.3:1 and 2.0:1.

No references cited.